D. K. SWARTWOUT.
APPARATUS FOR SEPARATING PARTICLES.
APPLICATION FILED MAY 7, 1908.
985,953.
Patented Mar. 7, 1911.
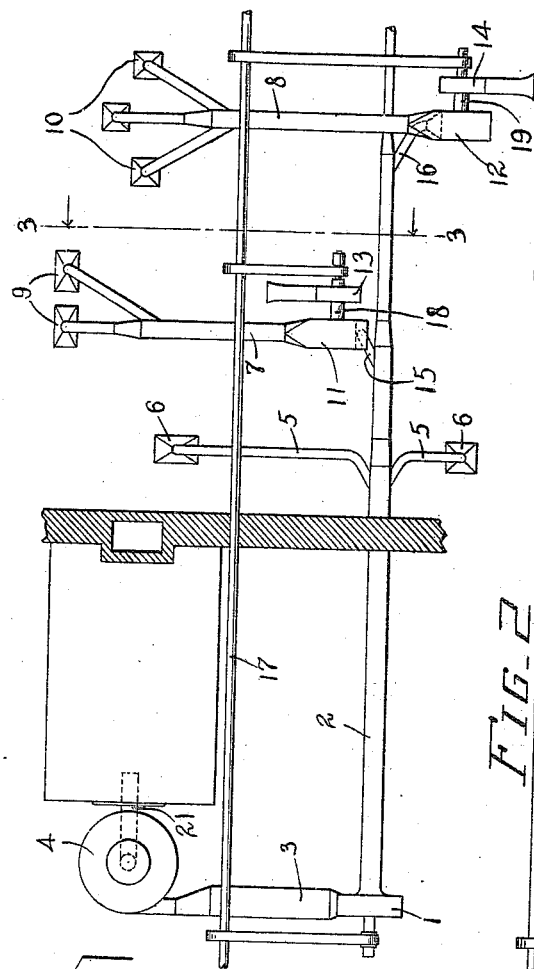
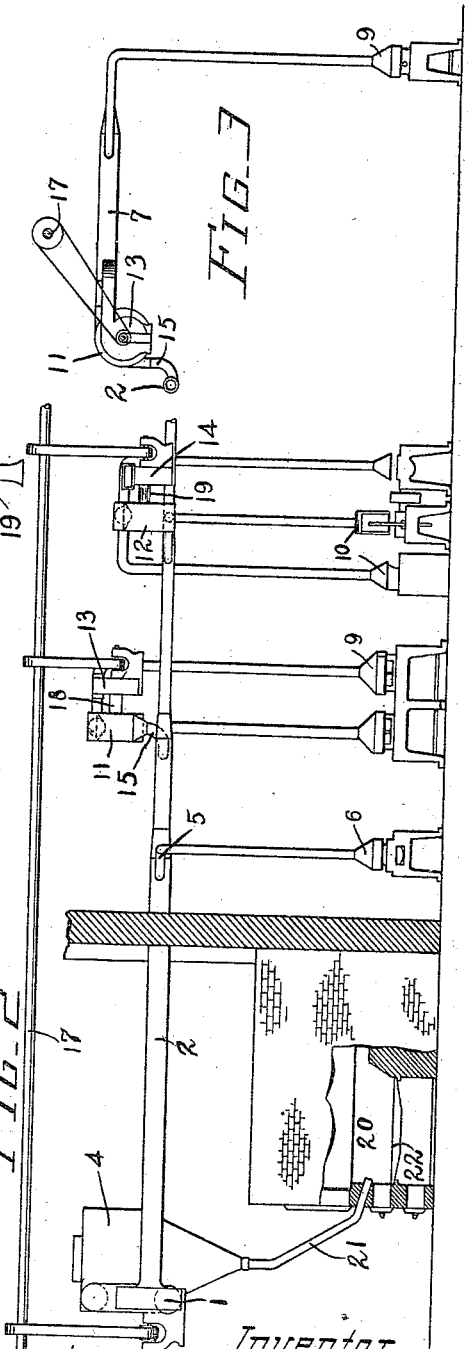

UNITED STATES PATENT OFFICE.

DENTON K. SWARTWOUT, OF CLEVELAND, OHIO, ASSIGNOR TO THE OHIO BLOWER COMPANY, OF CLEVELAND, OHIO, A CORPORATION OF OHIO.

APPARATUS FOR SEPARATING PARTICLES.

985,953. Specification of Letters Patent. Patented Mar. 7, 1911.

Application filed May 7, 1908. Serial No. 431,360.

*To all whom it may concern:*

Be it known that I, DENTON K. SWARTWOUT, a citizen of the United States, residing at Cleveland, in the county of Cuyahoga and State of Ohio, have invented a certain new and useful Improvement in Apparatus for Separating Particles, of which the following is a full, clear, and exact description, reference being had to the accompanying drawings.

This invention relates to an apparatus or system for collecting and conveying particles to a point where such particles are separated from the fluid medium in which they may be suspended, preferably by centrifugal action.

It has for its object to provide a simple but efficient method and a system or apparatus for accomplishing this purpose.

The apparatus or system comprises generally a main suction pipe and branch suction pipes discharging into separators communicating with the main suction pipe, the parts being so arranged as to prevent the discharge of particles into the air of the compartment wherein the apparatus or system may be installed, while preserving the circulation of air in such compartments.

Further objects of the invention are to avoid the wear on the fan blades of the suction devices by the impact of particles thereagainst; to render the apparatus flexible; to minimize the cost of operation and of installation, and more limitedly, to combine the apparatus with a furnace in such manner as to discharge the collected materials thereinto.

In carrying out my invention, I provide a main suction pipe having an exhaust fan blower connected thereto, said fan blower discharging into a centrifugal separator. This main suction pipe may be provided with any suitable number of branches each having a collecting hood which may be located over small machines to collect the particles (saw-dust, shavings, etc.,) that may be produced in the operation of such machines. For larger machines, or for groups of machines, I provide a suitable number of collecting hoods and connect such hoods to centrifugal separators, providing each of said separators with an exhaust fan blower which is located externally of the separator casing and the pipes which convey the particles thereto and therefrom. Each separator is connected with the main suction pipe. The fan blowers are so constructed and arranged that the suction produced by the auxiliary fan blowers will be less than that produced by the main fan blower, with the result that none of the light particles discharged into the auxiliary separators will pass through the auxiliary fans, but will be discharged into the main suction pipe. The auxiliary fan blowers thus assist the main fan blower and at the same time serve as local ventilating or air-circulating means. As will appear hereinafter, the system or apparatus is flexible, durable, economical in installation, and is also economical in operation.

The various advantages referred to are secured by the embodiment of my invention illustrated in the drawings forming part hereof, wherein—

Figure 1 represents a somewhat diagrammatic plan view of a system or apparatus constructed in accordance with my invention; Fig. 2 represents an elevation of the system or apparatus shown in Fig. 1; and Fig. 3 represents a view corresponding to the line 3—3 of Fig. 1, looking in the direction of the arrows.

Describing the parts by reference characters, 1 represents a principal exhaust fan blower which is connected with a suction main 2. The blower casing is provided with a tangential outlet pipe 3 communicating with a main centrifugal separator and collector 4.

5, 5 denote suitable branch pipes extending from the main 2 to collecting hoods 6, 6. These branch pipes and collecting hoods are intended for use with small machines, and may be of any desired number, according to the plant in which my system or apparatus may be installed.

7 and 8 denote pipes which are connected respectively with collecting hoods 9 and 10. These pipes are shown as branched and the branches are connected with a number of individual hoods for small machines, and the hoods may be of any suitable number, according to the requirements of the particular installation. Pipes 7 and 8 are connected tangentially with centrifugal separators 11 and 12, which in turn are connected with the auxiliary exhaust fan blowers 13 and 14 respectively. The separators are also connected with the suction main 2 by means of pipes 15 and 16 respectively, which, in the type of separator illustrated, extend tangentially from the casings thereof to the suction main.

17 denotes a line shaft provided with pulleys and belts by means of which the main fan blower and the auxiliary fan blowers are driven.

It will be noted that the pipes 18 and 19 which connect with the central portions of the separator casings 11 and 12, respectively, are of smaller diameter than the pipes 7 and 8, which extend from the collecting hoods to said separator casings. In practice, the areas of the pipes 18 and 19 will each equal the difference in area between the pipe (7 or 8) leading from a collecting hood or group of such hoods, and the pipe (15 or 16) leading from the separator casing to the suction main, such reduction in dimensions of the pipes 18 and 19 being rendered possible by the fact that the pipes 15 and 16 are connected with the suction main 2, which thus assists the auxiliary fan blowers in maintaining a suction or partial vacuum in the auxiliary separator casings.

Where the materials separated by my apparatus or system are combustible, I may discharge the same into a furnace. In the drawings, 20 denotes the fire-box of such a furnace, and 21 a discharge pipe leading from the separator 4 thereto and discharging above the furnace grate 22.

The whole system results in economy of installation, saving in the cost of piping, increased durability, saving in average horse power, and increase in flexibility over other systems with which I am familiar. The relatively powerful suction in main 2 and the interposition of the auxiliary separators 11 and 12 between the collecting hoods 9 and 10 and the auxiliary fan blowers prevent any of the collected material from passing through the auxiliary fan blower casings, which results in prolonging the lives of the auxiliary fans. The saving in the cost of piping is due to connecting the auxiliary separators with the suction main, which enables me to reduce the size of the piping employed to connect such separators with their auxiliary fan blowers. For instance, if pipes 7 and 8 are ten inches in diameter and pipes 15 and 16 are five inches in diameter, pipes 18 and 19 need be only nine inches in diameter. It will be obvious that when there is a considerable number of auxiliary fan blowers with pipes 18 and 19 of considerable length, there must necessarily be a material reduction in the cost of piping. Furthermore, if the collecting pipes 7 and 8 were connected directly to the suction main 2, then said main, fan 1, pipe 3, and separator 4 would all have to be of greater size than if the connections are made as herein described.

A further advantage of my invention resides in the fact that, as the suction in pipe 2 is ordinarily stronger than the suction exerted by the auxiliary fans, said auxiliary fans do not discharge any foreign material into the room or compartment wherein the system may be installed, but merely circulate air through the fan blower outlets, thus avoiding the necessity of discharging the air outside of the room in which the fan blowers may be located,—a point of decided advantage in cold weather. Flexibility is secured by operating the auxiliary fan blowers independently of the main fan blower, so that any one or more of the auxiliary collectors may be employed or dispensed with, according to circumstances, and additional auxiliary collectors may be added as occasion may require. Furthermore, this method of operation also produces a great average saving in horse-power, as it is unnecessary to operate the auxiliary separators and blowers except as desired.

Having thus described my invention, I claim:

1. In a collecting and separating apparatus, the combination of a main exhaust fan blower, a suction pipe connected thereto, a collecting pipe, a separator connected to said pipe, a pipe connecting the separator with the said suction pipe, and an exhaust fan connected with said separator and arranged externally thereof and adapted to produce a lower vacuum in the collecting pipe and separator than is created in said suction pipe by the main exhaust fan blower.

2. In a collecting and separating apparatus, the combination of a main pipe, means for creating suction therein, a plurality of collecting pipes, a separator connected with each of said pipes, a pipe connecting each separator with the main exhaust pipe, and a suction device located externally with respect to each separator and adapted to produce a suction in the collecting pipe and in the separator which is less than that produced within the main pipe.

3. In a collecting and separating apparatus, the combination of a main suction pipe, an exhaust fan connected thereto, a plurality of collecting pipes, a separator connected with each of said collecting pipes and with the main suction pipe, an exhaust fan connected with each separator casing, and connections for driving all of said fans independently.

4. In a collecting and separating apparatus, the combination of a main suction pipe, a suction device of comparatively high power connected thereto, a plurality of auxiliary collecting pipes, a separator connected with each of said collecting pipes, a pipe connecting each separator with the main suction pipe, a pipe extending from each separator, and a suction device of comparatively lower power connected with each of the latter pipes and arranged to produce less suction in its collecting pipe and separator than is produced in the main suction pipe, the pipes connecting the separators and the fans being of greater area than the pipes connecting the separators with the main suction pipe and the combined areas of the pipes connecting a separator with a fan and with the main suction pipe being substantially equal to the area of the corresponding collecting pipe.

5. A system for collecting and conveying light particles comprising a collector hood, a separator, and a pipe connecting the two, means connected with the separator for creating a partial vacuum in said separator and pipe to aspirate light particles through said head and pipe into said separator, a main discharge conduit, a connection between said conduit and said separator whereby said particles are discharged into said conduit, and means adapted to maintain a higher vacuum in said main conduit than that in said separator and pipe.

6. A system for collecting and conveying light particles comprising a collector hood, a separator, and a pipe connecting the two, an exhaust fan connected with said separator and adapted to aspirate particles through said pipe into said separator, a main discharge conduit, a connection between said separator and said conduit whereby said particles are discharged into said conduit, and means to aspirate said particles through said conduit at a higher velocity than that at which they were drawn into the separator.

In testimony whereof, I hereunto affix my signature in the presence of two witnesses.

DENTON K. SWARTWOUT.

Witnesses:
J. B. HULL,
A. J. HUDSON.

---

Copies of this patent may be obtained for five cents each, by addressing the "Commissioner of Patents, Washington, D. C."